(12) United States Patent
Vesterlund

(10) Patent No.: US 6,428,845 B1
(45) Date of Patent: Aug. 6, 2002

(54) DEVICE AND METHOD FOR APPLICATION OF A GLUING SYSTEM

(75) Inventor: Lennart Vesterlund, Huddinge (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/700,777

(22) PCT Filed: Jun. 16, 1999

(86) PCT No.: PCT/SE99/01083

§ 371 (c)(1),
(2), (4) Date: Nov. 20, 2000

(87) PCT Pub. No.: WO99/67027

PCT Pub. Date: Dec. 29, 1999

Related U.S. Application Data

(60) Provisional application No. 60/091,438, filed on Jul. 1, 1998, provisional application No. 60/091,440, filed on Jul. 1, 1998, and provisional application No. 60/091,442, filed on Jul. 1, 1998.

(30) Foreign Application Priority Data

Jun. 22, 1998 (SE) .............................................. 9802222
Jun. 22, 1998 (SE) .............................................. 9802223
Jun. 22, 1998 (SE) .............................................. 9802224
Oct. 16, 1998 (SE) .............................................. 9803549
Oct. 16, 1998 (SE) .............................................. 9803550
Oct. 16, 1998 (SE) .............................................. 9803551

(51) Int. Cl.$^7$ .............................................. B05D 5/10
(52) U.S. Cl. .................... 427/208.6; 427/286; 427/420; 118/314; 118/315

(58) Field of Search .......................... 427/207.1, 208.6, 427/286, 420; 118/DIG. 4, 314, 315

(56) References Cited

U.S. PATENT DOCUMENTS 2,916,012 A  * 12/1959  Hergenrother

FOREIGN PATENT DOCUMENTS

DE          4341443    * 3/1995
EP          0286939      10/1988

* cited by examiner

*Primary Examiner*—Fred J. Parker
(74) *Attorney, Agent, or Firm*—David J. Serbin

(57) ABSTRACT

A device for application of a gluing system of at least two components, such as a resin component and a hardener component comprising a unit of at least two hollow members, at least one member for each component, provided with a number of orifices in each member designed to apply the respective component onto a substrate below the hollow members to form strands, the hollow members being positioned above the plane of application, wherein the unit comprises means for adjusting the position of the orifices in at least one of the hollow members in relation to the position of the orifices in the other hollow members. The invention also relates to a method for applying a gluing system of at least two components, such as a resin component and a hardener component, in the form of strands, using the device.

22 Claims, 4 Drawing Sheets

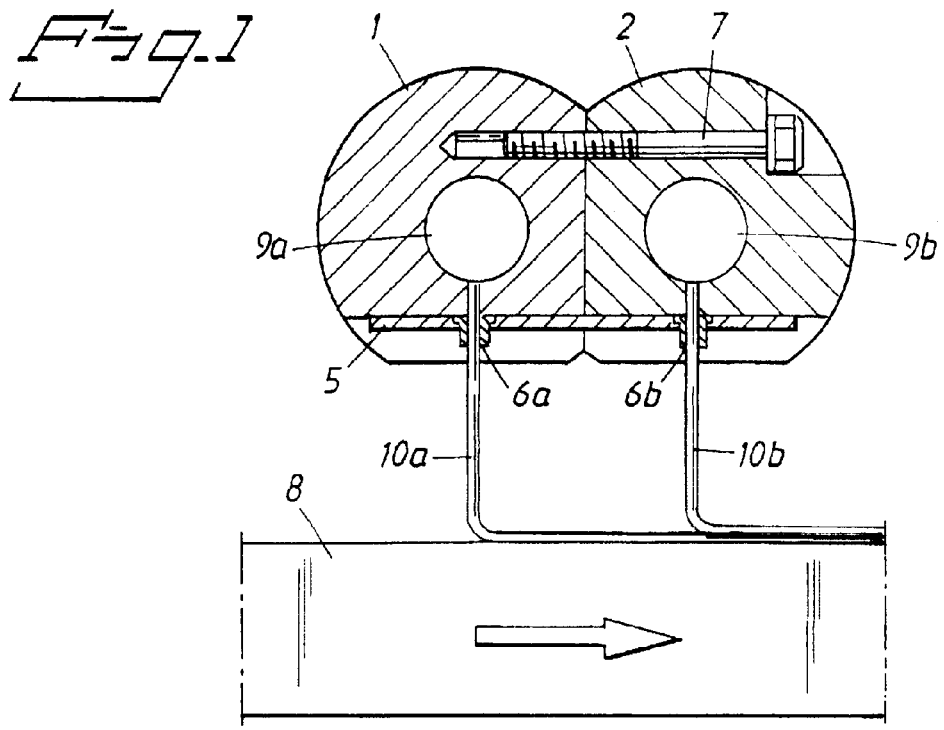
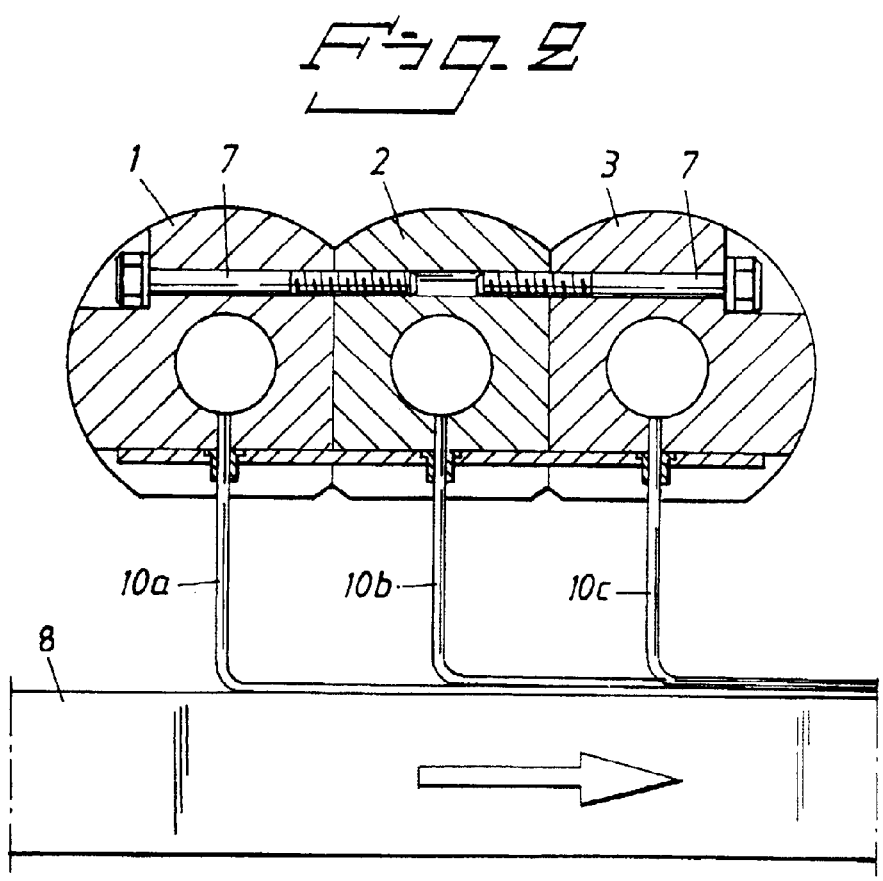

DEVICE AND METHOD FOR APPLICATION OF A GLUING SYSTEM

This application is a 371 of PCT/GB99/01083 filed Jan. 16, 1999, which claims benefit of provisional applications 60/091,038 filed Jul. 1, 1998, and 60/091,498 filed Jul. 1, 1998, and 60/091,442 filed Jul. 7, 1998.

The present invention relates to a device for separate application of a gluing system comprising at least two components, such as a resin component and a hardener component, onto a substrate, and an application method wherein said device is used.

Separate application of the components of a gluing system, such as resin and hardener components, is known in the art of gluing and offers the advantages of providing the components applied onto the substrate in a not thoroughly mixed condition. The actual mixing of the components applied is obtained in the further processing of the substrate, such as the pressing of two or more such substrates together, allowing for a longer period of time to lapse between application and pressing, without an undesired extent of curing occurring during said period. Also, since the components are separated in the application device the pot life of the gluing system will be markedly extended, and the risk of clogging will be brought to a minimum.

Sequential application in the form of strands of resin and hardener components by means of an application device comprising two independently mounted tubes, cf. SE-373 525, having a row of orifices through which the resin and hardener components are separately spread after each other onto the substrate, has been used in the prior art in the case of application of phenolic resorcinol gluing systems. This type of application results in more or less random distribution of the strands of one component in relation to the strands of the other component onto the substrate.

Another method of applying resin and hardener components is a special type of curtain application, for example, as that described in EP 286 939 B1. However, in this method a large surface area of the components are exposed to the surrounding atmosphere, leading to increased evaporation of the water contained in the components of the gluing system. Accordingly, this incurs a reduced period of time from the application of the components to application of pressure for pressing, which is a disadvantage when gluing large wooden beams, for instance.

Further, in the case of curtain application, it is hard to prevent the applied components from dripping off from the lamella when the lamella is turned 90 degrees (after the application, which is often necessary since the pressing equipment is often constructed such that the pressure is applied horizontally, i.e., the glue joints will be vertical. Thus, this method of application is more sensitive to variations in viscosity than the strand application method.

However, technical solutions are still sought for the need to find application systems for separate application of the components of a gluing system, which can be adjusted to the gluing system in question and the desired assembly times. By assembly time it is meant the time that lapse from the moment of application of a gluing system onto a substrate to the moment of pressing the substrates to be glued together.

The present invention accordingly provides a device, and a method using the device, by which the above-mentioned problems are overcome.

The device according to the invention is defined in the appended claims. It comprises a unit of at least two hollow members, at least one member for each component, provided with a number of orifices, from which orifices in each member designed to apply the respective component onto a substrate below the hollow members to form strands, the hollow members being positioned above the plane of application, wherein the unit comprises means for adjusting the position of the orifices in at least one of the hollow members in relation to the position of the orifices in the other hollow member(s).

The means for adjusting the position of the orifices, in at least one of the hollow members, in relation to the position of the orifices in the other hollow member(s), can be a common exchangeable nozzle plate covering at least two hollow members or alternatively it can comprise means for moving the hollow members in relation to each other in the cross machine section.

The orifices in the common nozzle plate can be arranged so that the later applied strands of one component substantially overlap, do not overlap, or do not contact, respectively, the corresponding strands of the previously applied component(s).

A common nozzle plate it may be suitable when the centre to centre distances between the hollow members is from about 5 mm to 900 mm, provided that the total distance, centre to centre, between the two most distant hollow members is no more than about 900 mm.

The moving means can move the hollow members in relation to each other in the cross machine direction. In this way the position of the orifices in at least one of the hollow members can be adjusted in relation to the position of the orifices in the other hollow member(s). Thus, the position of the hollow members in relation to each other can be adjusted so that the later applied strands of one component substantially overlap, do not overlap, or do not contact, respectively, the corresponding strands of the previously applied component(s).

With the device according to the present invention the strands can be applied safely and carefully at the accurate position on the substrate.

The device can be provided with guiding means, which are connected to the application unit, in order to prevent the components from falling onto the edges of the substrate that are not to be glued. The guiding means, during application, engage with the contour of the substrate in the machine direction, while the unit is being held movable in the cross machine direction.

The method according to the invention is defined in the appended claims. It comprises use of the above-described device for applying a gluing system of at least two components, such as a resin component and a hardener component, in the form of strands, onto a substrate.

The substrate is suitable fed under the hollow members through the device.

Depending on the reactivity of the components in the gluing system and the desired assembly times, the later applied strands may overlap, do not overlap, or do not contact, respectively, the corresponding previously applied strands of the other components.

As used here, the term "strand" also comprehends the meaning of the term "ribbon", also conventionally used in the art, and any other like term

BRIEF DESCRIPTION OF THE DRAWINGS

The invention will now be described in more detail with reference to the accompanying drawings.

FIG. 1 shows an embodiment of the device according to the invention to be used with two components, comprising two hollow members, 1 and 2, with a short c/c distance.

FIG. 2, shows an embodiment of the device according to the invention to be used with two or three different components, comprising three hollow members, 1, 2 and 3

DETAILED DESCRIPTION OF THE INVENTION

Figure 3:
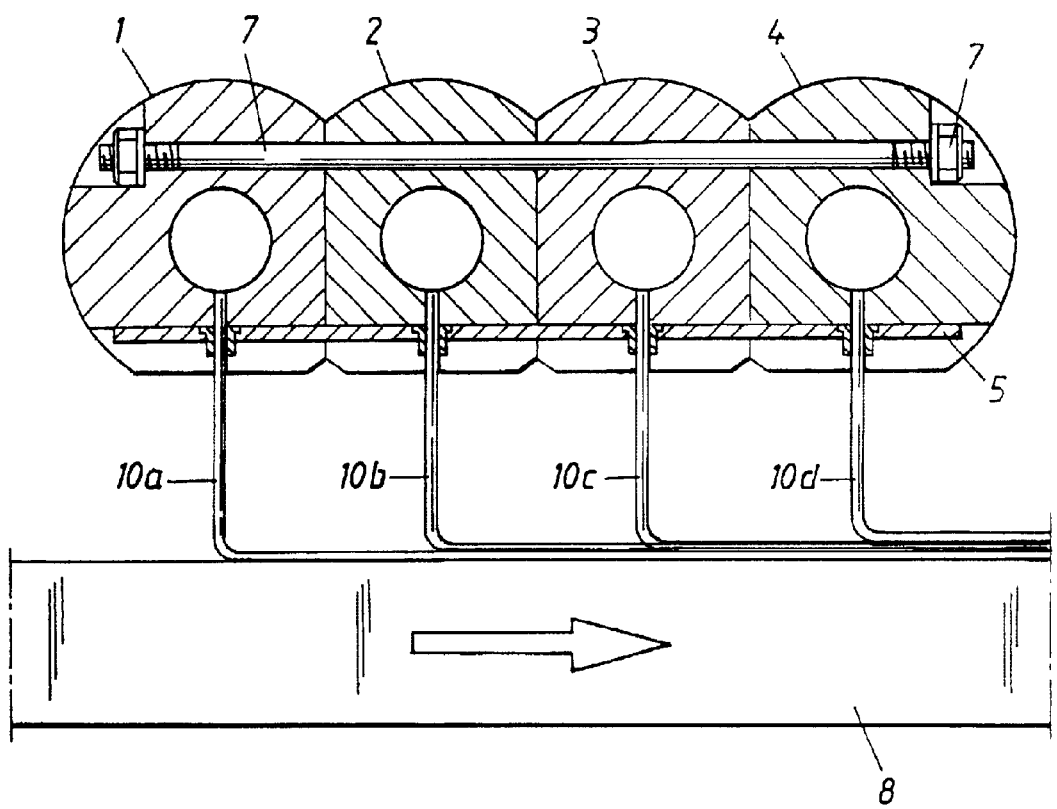
FIG. 3 illustrates an embodiment having four hollow members, 1, 2, 3 and 4.

In the Figures, the strands are designated by the reference numeral 10, and the letters a, b, c, and d, respectively, are used to denote details pertaining to the hollow member 1, 2, 3, and 4, respectively.

Each hollow member is provided with an inlet 9, through which the respective component is supplied. The device comprises at least two hollow members having a multitude of small holes 6, the members being fixed to each other in parallel by means of fixation means, forming a unit. The longitudinal axes of the hollow members are placed substantially perpendicularly to the machine direction of the device with spacing between said members in said direction. The sideways distance(s) between said members can be adjusted.

The small holes 6 of the hollow members are facing the substrate 8. Said holes constitute orifices for resin and hardener component, respectively, through which the components flow during application. At least one hollow member for each of the two above-mentioned components is provided in the device. Additional hollow members for application of the same or other additional desired components can also be provided in the device.

The orifices of each member can be at a distance of 2–16 mm, suitably 2–5 mm from each other, depending on the specific substrate to which glue is to be applied. The diameter of said holes can range from 1–10 mm, suitably 2–5 mm. A suitable substrate can, for instance, be a wooden lamella. Other substrates that can be used can be made of, for example, metal, plastic, or composite material. If desired, by selection of the proper distances and flow rates, the strands of any given component can be made to coalesce to an essentially coherent mass.

Suitable amounts of the components to be applied are in the range of 200–500 g/m2, depending, interalia, on the feeding rate. At feeding rates below 30 m/min difficulties in dosage are likely to be encountered due to discontinuous strands emanating from the orifices (dripping). A suitable feeding speed of the substrates is up to 300 m/min, more suitably 30–250 m/min, and preferably 60–200 m/min.

In FIG. 1, a device comprising 2 hollow members, 1 and 2, one for resin and the other for hardener components, is shown. The flow rates of the two components are adjusted by means of two pumps (not shown).

The holes 6 of the respective hollow members, from which the respective components are applied to the substrate, can be formed directly in the hollow member and/or in a nozzle plate as represented by reference numeral 5. Depending on the distance between the hollow members, two or more of the members can have a common nozzle plate 5, as shown in FIGS. 1, 2, and 3. A common nozzle plate is suitable when the centre to centre distances between the members are relatively short, e.g. 5–40 mm.

Depending on which arrangement of the position of the orifices of the hollow members in relation to each other within the common nozzle plate 5 that is desired in each occasion, the common nozzle plate 5 can simply be replaced with another nozzle plate 5 having orifices at suitable positions.

In FIG. 2, an embodiment such as depicted in FIG. 1 is shown, with the exception of that in the present embodiment three hollow members, 1, 2 and 3, are being used, one of which members can be used for the resin component, a second for the hardener component, and a third for hardener additives, such as for example an accelerator, respectively. This embodiment could also be used for application of only two components, such as resin-hardener-resin, for example, or resin and hardener together with a third component other than the accelerator.

FIG. 3 shows another embodiment wherein four hollow members, 1, 2, 3 and 4, is used for the application of, in the following order; glue, hardener, a hardener additive, such as an accelerator, and finally, glue again.

Figure 4:
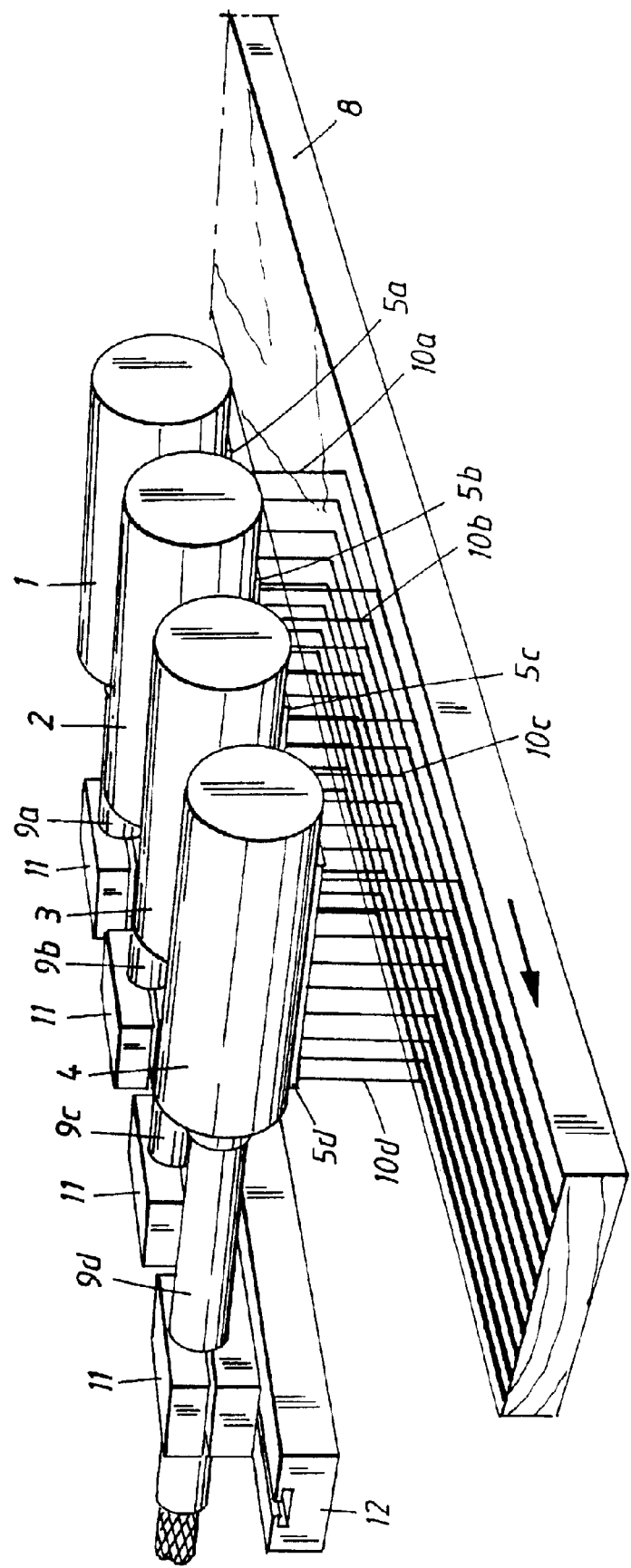
FIG. 4 shows another embodiment according to the invention with four movable hollow members 1, 2, 3 and 4.

FIG. 4 shows another embodiment; wherein the distance centre to centre between the hollow members is greater than in FIG. 3. In this embodiment separate nozzle plates, 5a–d, are used. Here, instead of fixation means 7 as shown in FIG. 1–3, fixation means 12 are used, which allow for regulation of the individual sideways distance between, said members. In this embodiment means for moving 11 the hollow members in relation to each other in the cross machine direction are used.

Figure 5:
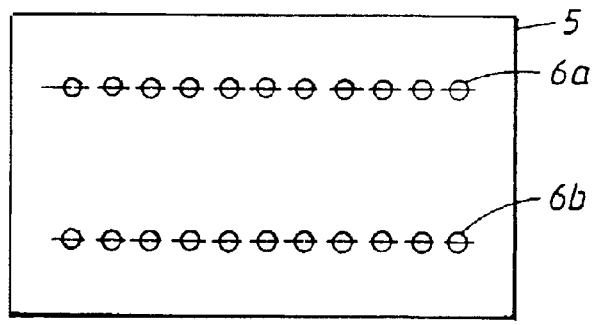
FIGS. 5 and 6 show two different positions of the orifices of one hollow member in relation to the orifices of the other hollow member in the common nozzle plate for an embodiment according to FIG. 1. Finally.
Figure 7:
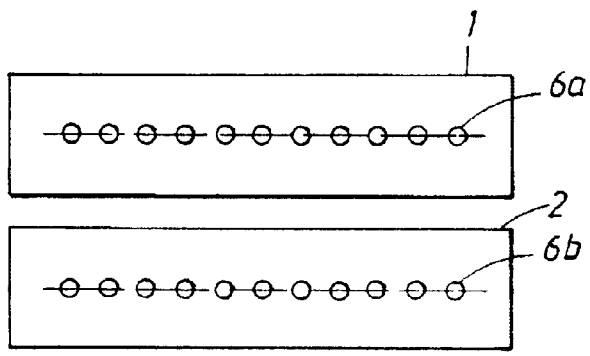
FIGS. 7 and 8 show two different positions of one hollow member and its orifices in relation to the other hollow member and its orifices for an embodiment according to FIG. 4 but with only two hollow members.

In FIG. 5 the orifices of one hollow member in relation to the orifices of the other hollow member, within a common nozzle plate 5 are shown, wherein each of the orifices 6a in one of the hollow members are aligned in the machine direction with the corresponding orifices 6b of the other hollow member. FIG. 7 also shows the orifices of two hollow members being aligned in relation to each other in the cross machine direction, with the exception that the hollow members here do not have a common nozzle plate and the position of the hollow members is adjusted by the moving means 11 in the cross machine direction. The embodiments shown in these figures enable application of a resin and a hardener onto a substrate, wherein the later applied strands of one component are overlapping the previously applied strands of the other component.

Figure 6:
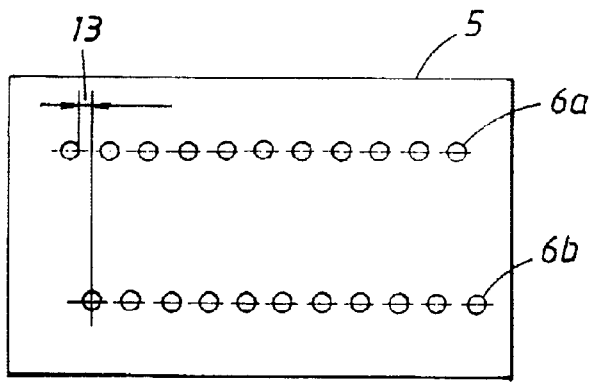
Figure 8:
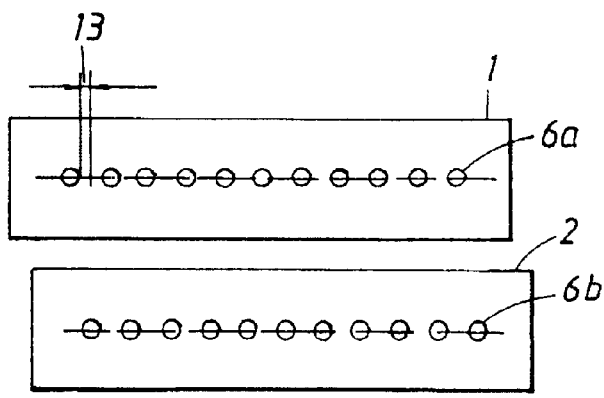

FIG. 6 shows an embodiment with two hollow members with a common nozzle plate 5, wherein each of the orifices 6a in one hollow member are parallel displaced in the machine direction in relation to the corresponding orifices 6b of the other hollow member. FIG. 8 shows an embodiment with two hollow members without a common nozzle plate, wherein one hollow member is moved in the cross machine direction, in relation to the other hollow member so that each of the orifices 6a of one hollow member are parallel displaced in the machine direction, in relation to the corresponding orifices 6b of the other hollow member. The embodiments shown in these figures enable application of a resin and a hardener onto a substrate, wherein the later applied strands of one component are applied at a certain distance 13, depending on the gluing system used and the wanted assembly time, in relation to the previously applied strands of the other component.

Depending on the reactivity of the components of the gluing system and the desired assembly time, the strands of the different components, such as the hardener and the resin, can be applied in relation to each other in various suitable ways. Thus, for low reactive/slow curing gluing systems, and/or short assembly times, it is suitable that the later applied strands of one component overlap the corresponding strands of the previously applied component(s), or they are applied adjacent to each other so that they are in essentially contact with each other. When high reactive/fast curing gluing systems are used, and/or long assembly times are desired, it is suitable that the later applied strands of one component are applied with a certain distance 13 in relation to the corresponding strands of the previously applied component(s). For assembly times of about 60–120 min a distance of about 4–8 mm between the strands of the different components of the gluing system, such as the hardener and the resin, is suitable, for assembly times of about 15–60 min a distance of about 24 mm is preferred, and for assembly times of about up to 15 min overlapping of the strands or essentially contact between them is preferred.

According to one embodiment of the present invention the strands of resin and hardener components, respectively, are applied uniformly after each other so that essentially continuous contact of each strand of one component with each corresponding strand of the other component(s) is achieved throughout the length of the strands. That is, the later applied strands of one component will normally substantially overlap the corresponding strands of the previously applied component(s). Thereby, a relatively smaller strand, normally the hardener component, can be brought to lie substantially within the width of a larger strand, e.g., on top of, or under a larger strand, depending on the order of application. The strands of one component can also be applied in such close proximity to the adjacent similar strands so that, when applied to the substrate, said strands form an essentially coherent liquid mass, on to which mass, subsequently, an essentially coherent mass of a second component can be formed in the same manner.

According to one embodiment of the invention, there is provided a device, by means of which the components can be prevented from falling onto the edges of the substrate that are not to be glued, and thereby eliminate any faulting or other negative effects resulting from the components contacting undesired areas of the substrate. Thereby, also the glue waste is reduced. In this embodiment the device is provided with guiding means (not shown), as conventionally used in the art. Said guiding means, which is held in contact with the contour of the substrate, i.e., the side edges of the substrate in the direction of motion, is connected to the unit, which in turn is mounted movably in the cross-direction of the device, whereby a contour-following movement of the unit comprising the hollow members during the application of the components is established. The substrates used together with this embodiment can be somewhat curved or twisted while the above-described advantages still are obtained By the use of guiding means in the application according to the invention, one avoids the spreading of any of the components on the outer surfaces of and the amount of waste, or the need for the collecting and/or recirculation of any excessive volumes of the components used falling outside the substrate is thereby reduced to a minimum. The guiding means can for example be comprised of guiding plates, which are mounted on a common axis with the distance between said guiding plates being adjustable in order to match different width of substrates used.

The holes 6 of the hollow members 1,2,3,4 can be covered from inside by means of a rod-shaped device (not shown), operated from outside, that can be brought into said member from the end thereof, parallel to the longitudinal axis thereof, and locked in the desired position in order to adjust the number of the open holes 6 to the width of the specific substrate 8. The way of regulating the width used of the hollow members to the width of the substrate is not critical and can be accomplished in any suitable manner.

The device according to the invention can have a start stop and/or a circulating system.

The distance between the centres of the hollow members 1,2,3,4 is dependent on the method of feeding the components to the members, a few examples of which will be described hereinafter, and the number of members used, and can range from about 5 to 900 mm.

Thus, as an example, in the case of an embodiment of the invention having four hollow members, as shown in FIGS. 3 and 4, a suitable distance from the centre of the one outer hollow member to the centre of the other outer member (i.e., 1 and 4 in the figures) is in the range of about from 15 to 900 mm. With only two members, as shown in FIG. 1, the distance from centre to centre is from about 5 to 900 mm, a suitable range being 40 to 300 mm. In any case, for practical considerations, the total distance should suitably not exceed about 900 mm.

In the case of separate continuous recirculation of the respective components, the excessive amounts of the components not applied to the substrate 8, collected in the respective collecting trays (not shown) positioned under the hollow members, are directed back to the respective hollow member by means of pumping, together with the components fed from the supply tanks. Thus, the components are continuously running from the respective members. Here, a larger distance, such as about 300 to 900 mm, is preferred in order to prevent any splatter of the first component from the front of a lamella to reach in to the collecting tray of the other component as mentioned above.

In the case of the so called start/stop operation, there are two different types of pumping in order to feed the components to the hollow members, firstly, a simple type, and secondly, a more elaborate one. In the first type the pumping of the respective component is switched on shortly before the front of the lamella reaches the respective hollow member, and then shortly after the passage, is switched off again. The second type is based on continuous circulation by means of pumping of the components in different circulation lines, from which lines the respective components are drained to the hollow members by means of 3-way valves. This latter method makes the start and stop of the application of the components more instant, due to the continuous pressure maintained in the circulating lines. The amount of the components not falling onto the substrate in the start/stop operation mode will in either case constitute the glue waste. In the former type said waste will typically be of the order 2–4%, and in the latter even less.

In case of the start/stop operation, the distance between the centres of adjacent hollow members can be reduced to 5 mm, whereby the equipment can be made relatively small and easy to adjust to already existing manufacturing lines. The short distance will also improve the accuracy of the application according to the present invention.

From a working place environmental consideration, the start/stop operation is normally preferred, since any undesired emissions from the gluing system components in the respective collecting trays are reduced. Also, by not having the components continuously running from the hollow members, any such emissions are reduced.

The order of application of the resin and hardener components, respectively, is not critical and can be chosen as appropriate depending on the substrate, the specific components used, the subsequent processing, and the desired characteristics of the ultimate product. By using the device according to the invention hardeners comprising aggressive acids could be used since they can be prevented from getting into direct contact with the substrate. For example, this can be achieved by the application of the sequence of resin-hardener-resin, thereby securing the contact of the substrate with only the resin component, even when gluing said substrate together with another piece of substrate not provided with glue.

Also, when using a component comprising a substance which desirably should be prevented from being emitted into the atmosphere, or into a specific surrounding environment for any reason, such as for example a volatile acid in the hardener component, such component can suitably be applied followed by at least one other component covering the component comprising the substance to be prevented from being emitted. For instance, in case of application of a gluing system comprising a resin component and a hardener component, the latter of which comprises a volatile acid, such as formic acid, acetic acid or pyrovic acid, which acid not necessarily must be prevented from contacting the substrate, a suitable order of application would be the hardener component first, which thereafter is covered with the resin component.

Thus, the device and method according to the present invention offer many advantages, such as, for example, reduced glue waste, improved working environment during application, the possibility of gluing substrates which are sensitive to one of the components used, and also the benefits of a volume-effective system.

Examples of gluing systems which can be used together with the device according to the present invention are urea-formaldehyde, melamine-urea-formaldehyde, phenol-resorcinol-formaldehyde, emulsion polymer isocyanate, two component polyvinyl acetate, and two component polyurethane gluing systems.

The device according to the present invention can, for example, advantageously be used in a method of separate application of resin and hardener components of an amino resin gluing system wherein both component are applied in the form of strands in optional order of application, wherein the first applied component optionally can coalesce to form an essentially continuous layer thereof, onto which the other component is applied.

Another method wherein the present device suitably can be used is a method comprising separate application of resin and hardener components of an expandable gluing system in the form of strands, wherein said hardener component is acidic, and the resin component comprises one or more gas generating substances capable of forming a gas when contacted with said hardener component. The gas generating substance can be any carbonate or hydrogen carbonate that will generate $CO_2$ upon contact with an acid. Suitable examples are, for instance, sodium hydrogen carbonate, calcium carbonate, sodium carbonate, ammonium carbonate, ammonium hydrogen carbonate, magnesium carbonate, or a mixture thereof.

While the present invention has been described with reference to embodiments wherein the substrate is being fed in the machine direction under the unit comprising the hollow members, the converse mode of operation is also conceivable within the scope of the appended claims, i.e., the substrate could be immobile with the unit passing above it during application of the components.

What is claimed is:

1. A device for application of a gluing system of at least two components, comprising a unit of at least two hollow members, at least one member for each component, provided with a plurality of orifices in each member designed to apply the respective component onto a substrate below the hollow members to form strands, the hollow members being positioned above the plane of application, wherein the unit comprises means for adjusting the position of the orifices in at least one of the hollow members in relation to the position of the orifices in the other hollow member(s), wherein the means for adjusting the position of the orifices is a common exchangeable nozzle plate covering at least two hollow members.

2. The device according to claim 1, wherein the orifices for each of the hollow members in the common nozzle plate can be arranged so that the later applied strands of one component substantially overlap the corresponding strands of the previously applied component(s).

3. The device according to claim 1, wherein the orifices for each of the hollow members in the common nozzle plate can be arranged so that the later applied strands of one component do not overlap the corresponding strands of the previously applied component(s).

4. The device according to claim 1, wherein the orifices for each of the hollow members in the common nozzle plate can be arranged so that the later applied strands of one component do not contact the corresponding previously applied strands of the other component(s).

5. The device according to claim 1, wherein the distance center to center between the hollow members is from about 5 mm to about 900 mm, provided that the total distance, center to center, between the two most distant hollow members is no more than about 900 mm.

6. The device according to claim 1, wherein the unit is provided with guiding means connected to the unit, which means during application engage with the edge contour of the substrate in the machine direction, the unit being movable in the cross machine direction.

7. The device according to claim 1, wherein the at least two components comprises at least one resin component and at least one hardener component.

8. A device for application of a gluing system of at least two components, comprising a unit of at least two hollow members, at least one member for each component, provided with a plurality of orifices in each member designed to apply the respective component onto a substrate below the hollow members to form strands, the hollow members being positioned above the plane of application, wherein the unit comprises means for adjusting the position of the orifices in at least one of the hollow members in relation to the position of the orifices in the other hollow member(s), wherein the means for adjusting the position of the orifices comprises means for moving the hollow members in relation to each other in the cross machine direction.

9. The device according to claim 8, wherein the position of the hollow members in relation to each other can be adjusted so that the later applied strands of one component substantially overlap the corresponding strands of the previously applied component(s).

10. The device according to claim 8, wherein the position of the hollow members in relation to each other can be adjusted so that the later applied strands of one component do not overlap the corresponding strands of the previously applied component(s).

11. The device according to claim 8, wherein the position of the hollow members in relation to each other can be adjusted so that the later applied strands of one component do not contact the corresponding previously applied strands of the other component(s).

12. The device according to claim 1, wherein the at least two components comprises at least one resin component and at least one hardener component.

13. A method for applying a gluing system of at least two components on a substrate, by using a device comprising a unit of at least two hollow members, at least one member for each component, provided with a plurality of orifices in each member designed to apply the respective component onto a substrate below the hollow members to form strands, the hollow members being positioned above the plane of application, the unit comprising means for adjusting the position of the orifices in at least one of the hollow members in relation to the position of the orifices in the other hollow member(s), said means for adjusting the position of the orifices being a common exchangeable nozzle plate covering at least two hollow members, wherein at least two components are separately applied from separate hollow members after each other, in the form of first applied strands, and later applied strands, onto the substrate.

14. The method according to claim 12, wherein the substrate is fed under the hollow members through the device.

15. The method according to claim 13, wherein the later applied strands of one component substantially overlap the corresponding previously applied strands of the other component(s).

16. The method according to claim 13, wherein the later applied strands of one component do not overlap the corresponding previously applied strands of the other component(s).

17. The method according to claim 13, wherein the later applied strands of one component do not contact the corresponding previously applied strands of the other component(s).

18. A method for applying a gluing system of at least two components onto a substrate, by using a device comprising a unit of at least two hollow members, at least one member for each component, provided with a plurality of orifices in each member designed to apply the respective component onto a substrate below the hollow members to form strands, the hollow members being positioned above the plane of application, the unit comprising means for adjusting the position of the orifices in at least one of the hollow members in relation to the position of the orifices in the other hollow member(s), said means for adjusting the position of the orifices comprises means for moving the hollow members in relation to each other in the cross machine direction, wherein at least two components are separately applied from separate hollow members after each other, in the form of first applied strands, and later applied strands, onto the substrate.

19. The method according to claim 18, wherein the substrate is fed under the hollow members through the device.

20. The method according to claim 18, wherein the later applied strands of one component substantially overlap the corresponding previously applied strands of the other component(s).

21. The method according to claim 18, wherein the later applied strands of one component do not overlap the corresponding previously applied strands of the other component(s).

22. The method according to claim 18, wherein the later applied strands of one component do not contact the corresponding previously applied strands of she other component(s).

* * * * *